United States Patent
Starkey

[19]

[11] Patent Number: 5,882,695
[45] Date of Patent: Mar. 16, 1999

[54] DEMOUNTABLE MOLD PIN AND BUSHING SYSTEM AND REPLACEABLE BUSHINGS THEREFOR

[75] Inventor: Glenn Starkey, North Barrington, Ill.

[73] Assignee: D & L Incorporated, Wauconda, Ill.

[21] Appl. No.: 594,885

[22] Filed: Feb. 9, 1996

[51] Int. Cl.⁶ .................................................. B28B 17/00
[52] U.S. Cl. ......................... 425/168; 425/190; 425/191; 425/192 R
[58] Field of Search ................................. 425/168, 190, 425/191, 192 R

[56] References Cited

U.S. PATENT DOCUMENTS

| | | | |
|---|---|---|---|
| 1,817,892 | 8/1931 | Claus . | |
| 2,250,753 | 7/1941 | Dieckmann | 151/32 |
| 2,480,043 | 8/1949 | Paulus et al. | 292/149.5 |
| 4,202,522 | 5/1980 | Hanas et al. | 249/102 |
| 4,372,738 | 2/1983 | Black et al. | 425/451.9 |
| 4,671,764 | 6/1987 | Hehl | 425/595 |
| 5,330,273 | 7/1994 | Tsai | 384/235 |
| 5,332,384 | 7/1994 | Abramat | 425/522 |
| 5,334,006 | 8/1994 | Hepler et al. | 425/190 |
| 5,387,096 | 2/1995 | Wieser | 425/190 |
| 5,417,913 | 5/1995 | Arend | 264/328.1 |
| 5,431,556 | 7/1995 | Luther | 425/556 |
| 5,439,368 | 8/1995 | Martin | 425/190 |
| 5,449,282 | 9/1995 | Brown et al. | 425/190 |
| 5,466,145 | 11/1995 | Takahashi | 425/190 |
| 5,648,106 | 7/1997 | Miyairi et al. | 425/186 |

*Primary Examiner*—David W. Wu
*Attorney, Agent, or Firm*—Fitch, Even, Tabin & Flannery

[57] ABSTRACT

A guiding mechanism and method are provided for properly aligning molds or portions thereof, such as ejector plates, as they are cycled. The guiding mechanism is an improvement over conventional bushings which require that the mold in which the bushings are mounted to be removed from the press and disassembled and thereafter, the press fitted bushings are pressed out. Herein, the bushings are provided with a replaceable insert or portion that is easily disconnected from the remainder of the bushing such as by unthreading a threaded insert from a threaded bushing body without removing the mold half from the press. A first replaceable insert can be mounted in the bushing body which is sized to receive the leader pin to guide the leader pins therein and align the mold halves as they are moved to the closed position. Alternatively, the inserts are mounted on the pins and are sized to be received in the bushings which guides the pins and inserts therein to align the mold halves or to guide the mold ejector plates for movement thereon. The first replaceable insert is replaceable with the a second insert of the same size as the first insert. The method of running a press includes the cycling of the mold halves until the pin or bushing inserts are worn, and then replacing the worn inserts by disconnecting them from the insert bodies and connecting new inserts to the insert bodies without removing the mold from the press or disassembling the mold halves.

27 Claims, 10 Drawing Sheets

DEMOUNTABLE MOLD PIN AND BUSHING SYSTEM AND REPLACEABLE BUSHINGS THEREFOR

FIELD OF THE INVENTION

This invention relates to methods of and apparatus for aligning mold plates of a mold and, more particularly to an improved method and apparatus for replacing worn leader pins or posts and bushings therefor in a mold half. This invention also relates to replaceable bushings for use in such molding apparatus.

BACKGROUND OF THE INVENTION

In injection molding, molds are held and clamped in a mold press for cycling of the molding unit by closing and opening the mold halves. When the mold halves are brought together, they can form one mold cavity in single cavity molds, and more than one cavity in multi-cavity molds. During molding cycles, the mold halves are aligned with each other by leader guide pins on one of the mold halves entering aligned bushings in the other mold half. Typically, the mold halves are vertically aligned with the cavity or upper mold half provided with a lower cavity plate in which the leader pins are mounted and the core or lower mold half having an upper plate in which the bushings are mounted. Generally, four leader pins are mounted at the corners of the lower plate of the cavity half and four bushings are correspondingly located at the four corners of the upper plate of the core half. The pins are aligned with corresponding bushings and are sized to provide a slight clearance, generally on the order of approximately 0.001 inches, between the pins and their corresponding bushings. However, during mold fitting and assembly, there will usually be some slight misalignment between the mold halves. Thus, as the molding unit is cycled, the leader pins cooperate with the bushings to provide for a higher degree of alignment between the mold halves relative to each other as they are brought together for forming of a molded article and, during mold construction, to correct for any misalignment that has occurred such as due to misalignment of press platens.

In a growing number of molds, hot runner molding has become increasingly common to improve the efficiency of the injection molding process. When hot runners are used, the material in the sprue and runners, instead of being hardened and removed from the mold along with molded articles, is kept hot by means of the heating elements built into the mold and remains in the mold between shots. In this manner, the plastic molding material in the sprue and runners in a given shot remains hot enough and soft enough to be pushed into the mold cavity on the next shot and become a molded article. As the charge of heated plastic molding material is injected through the upper stationary cavity half of the mold, this half is typically termed the "hot half" while the core is referred to as the "cold half" providing a temperature differential between the two during molding operations.

In addition to the usage of the hot runner molding, the development of engineered thermoplastics used as molding material which are cycled at increasingly higher temperatures can produce relatively high temperature differentials between the cavity and core halves of the mold. As the lower plate of the cavity half of the mold is hotter than the upper plate of the core half, the amount of thermal expansion the cavity half will undergo will be greater than that in the core half. This causes the leader pins to move a greater extent than the bushings from their original positions. As the original clearance between the pins and bushings is relatively slight, any thermal expansion can cause interference therebetween. Interference between the pins and bushings caused by such thermal expansion generally leads to faster wearing of the pin and bushing contacting surfaces, such as by galling and scoring surface damage, over that encountered if thermal expansion was not a problem. Such wear of the leader pins and bushings can progress to the point to where it impairs their ability to perform their alignment function for the mold halves. In extreme situations, scoring of the pins and bushings can cause the mold halves to lock up as the pins and bushings essentially become welded to each other. As is apparent from the above, there are two primary sources of leader pin to bushing wear. One is where the pins and associated bushings are correcting misalignment by moving one mold half into proper registration with the other mold half. The other is when unequal thermal expansion is occurring between the mold halves causing the leader pins and their bushings to move off of their coinciding center points producing interference between the mating components.

Other bushings that need to be replaced and require a tearing apart of the mold to replace them are the bushings that are mounted in an ejector assembly having ejector pins that push out and eject the mold article from the mold cavity. The ejector assembly has stationary pins and ejector plate bushings which slide on the pins with cycling of the mold. Thus, bushings and/or pins are subject to wear and the misalignment problems described herein, and require a tearing apart of the mold to demount the old worn bushings and to replace them with new bushings. Hereinafter, (unless specified otherwise) the term "bushings" is used generically for the bushings in either mold or die half or in the ejector plate; and the term "pins" is used generally for mold half leader pins or the pins which guide the ejector plate.

The pins and/or bushings can be provided with a lubricant so that the pin more readily slides into and out of the bushing during a molding cycle despite the close tolerances therebetween. However, in many plastic molding applications, it is necessary to mold plastic parts in a production process that is free of oil, grease, or other liquid lubrication. This type of lubrication can migrate to the molding surface and ultimately to the molded part. In addition, the molded part may contact the leader pin upon ejection from the mold. Typical examples of where these are unacceptable occurrences would be plastic parts for medical applications, parts for the food packaging industry, electronic parts, and clear acrylic parts for lenses or displays. Moreover, where engineered thermoplastics are run at very high temperatures, most common forms of lubrication tend to break down so that they are no longer effective. Finally, even in applications allowing for use of lubrication, failure to maintain a proper amount of lubrication can lead to premature wear. As in apparent, in these "dry" applications or where the lubricants used to fail, the pins and bushings will be more quickly subject to wear and damage.

To run molds in proper alignment, worn pins and bushings must be removed from their associated mold plates and replaced with new components. Removal of damaged leader pins and bushings is a cumbersome and time consuming process. First, the molding unit must be shut down and the mold must be removed from the press. The bushings and pins are typically press or force fitted into bores in their respective mold halves. The mold is then disassembled with the pins and bushings then being pounded out of their respective mold or ejector plates and replaced with new pins and bushings, which are force fitted into the respective bores in the mold halves. The mold is then reassembled and installed back into the press until the pins and bushings once more need to be changed over. As is apparent, the above process leads to significant downtime reducing production efficiency which is undesirable.

To reduce the amount of downtime, molders sometimes attempt to avoid the significant time associated with the required disassembly of the plates by turning down the leader pins such as by 0.005 inches or opening the bushings a similar amount so that they do not make contact during molding cycles. When this occurs, the leader pins and bushings no longer serve their aligning function and another alignment mechanism is required on the mold halves, such as a side lock utilizing parallel surfaces which do not interfere when unequal thermal expansion occurs. Thus, there is a need for guiding mechanisms for mold halves which can be used in a wide variety of applications and run for a greater number of cycles. In addition, it is desirable for the guiding mechanism to be easily replaceable, such as if it is worn, without having to remove the mold from the press and then disassemble the mold.

It is desirable to retrofit existing molds without having to do any machining thereof when installing new, easily replaceable bushings that can be replaced without having to remove the mold from the press. That is, it is undesirable that the molds would have to be re-machined to accept replaceable bushings as this would result in additional down-time and labor costs. Further, machining of molds at the parting line leaves areas for flashing or collection of unwanted material along the parting line. Additionally, it is desirable to provide, easily replaceable bushing inserts for current mold designs that do not require the molds to be custom-made or custom designed for a special design of a bushing.

SUMMARY OF THE INVENTION

In accordance with the present invention, injection molds may be provided with replaceable bushings that may be replaced without removing the mold from the press and without pounding or pressing of the pins or posts and/or bushings from the mold. This is achieved by having a bushing body press fitted into the mold and have a replaceable insert releasably connected to the bushing body such as by threads. Thus, the replaceable insert may be unthreaded from the bushing body when the mold halves are separated and leave a space between mold halves at the parting line without having to remove the mold half from the press. Preferably, the bushing body has the same outer diameter as the conventional bushing so that a mold half may be retrofitted by pressing out the conventional bushing and pressing in the bushing body into the same bore in the mold half. Thus, there is no machining required of the mold half being retrofitted with the replaceable bushings, in the preferred embodiment of the invention. Preferably, newly manufactured molds may be constructed with their same usual construction with the same bores and no extra machining; and the multi-piece insert and bushing body may be inserted into the same bores that would have received the usual conventional bushings. This is a significant advantage as most mold building companies have significant investment capital tied into their tooling, such as drills and counter bores, such that changing the bushing size from current industry standards would entail an undesirable expense in re-tooling for the different sizes.

By having removable inserts, the material of the insert may be changed for example, from a hard metal to a softer metal or to a plastic material. The insert material may be selected to reduce wear, or to allow for greaseless environments, etc. Usually, the insert can be selected for a particular application thereby providing the molder with greater flexibility in choosing between inserts formed of materials having different hardness and wear characteristics. In this regard, a first series of inserts can be offered and manufactured from steel and plated with a friction reducing coating which may find use in applications where misalignment is anticipated. A second series can be manufactured from a material such as an engineered thermoplastic and may be particularly useful where it is anticipated that there will be interference generated by unequal thermal expansion between mold halves. Another series can be offered made from an aluminum-bronze alloy to contend with greaseless environments at temperatures higher than that with which a thermoplastic bushing can be used. As is apparent, different series of inserts can be developed to address specific conditions for various injection molds.

As either the pin or bushing can have a replaceable component, it is desirable for the replaceable component to be the part that wears while leaving the mating component free of damage. So, for example, with replaceable inserts for bushings, it is desirable that the bushing insert be a sacrificial wear part without damaging the mating pin. Conversely, with a front loading replaceable insert used with the leader pin, the pin insert is the sacrificial part.

In one form, the various inserts each have an internal bore extending lengthwise through the insert with the bores of the inserts being of equal diameter and length. The interchangeable inserts herein can be provided in sets of inserts to fit a specific size of bushing body.

In one form, the bushing body is internally threaded and the cylindrical inserts have external threads with the inserts threadingly received in the bushing body to allow the inserts to be interchanged without removing the bushing body from the second mold half and with the second mold half held by the mold press. The cylindrical inserts can have upper slots formed therein to allow a torquing tool to engage in the slots and screw and unscrew the inserts into and out of the bushing body. Thus, changeover from one insert to another, such as when an insert is worn or for when an insert of a different material is desired for a specific application, is rendered significantly easier while eliminating the downtime accompanying removal of the mold half from the press and disassembly thereof for pounding out the bushings as is currently done. Furthermore, besides reducing downtime, the level of skill required to change the inserts is much more generic than the skills required to disassemble a complex injection molding unit.

In one form, the mold halves define a part line therebetween in the closed position and the bushing body and insert do not extend beyond the part line. In this fashion, the bushing body and insert can be retrofit into standard mold hollows utilized for current bushings without requiring re-machining.

The leader pin can be provided with a tapered portion provided at the base of the pin adjacent the first mold and the top of the inserts can have a correspondingly configured taper so that the pin is guided into aligned position within the insert and bushing as the mold halves move to their closed position.

In another form of the invention, an injection molding assembly is provided including a mold body having a pair of mold halves for molding a plastic part with one of the mold halves being movable by the press between open and closed positions relative to the other mold half. The mold halves have plate surfaces forming a part forming cavity and defining a part line therebetween in the closed position. Leader pins on the other mold half extend beyond the part line surface for aligning the mold halves as they are moved in the closed position and corresponding bushing bodies are mounted in the one mold half. Cylindrical inserts are mounted in the bushing bodies and are sized to receive the leader pins of the other mold half as the mold halves are moved to their closed part forming position. The inserts are removable from the bushings while leaving the bushing bodies in the one mold half and the mold halves held in the press. Thus, replacing the inserts of the present invention is significantly simplified and reduces downtime facilitating the provision of inserts of different materials which can be selected according to the specific application with which the injection molding assembly is to be used. As previously discussed, the replaceability and interchangeability of the inserts is particularly desirable such as during hot runner molding or high temperature cycling of molding material where there is a temperature differential between the mold halves. The thermal expansion of the mold plates generated by their temperature differential increases the interference between the pins and bushings requiring that the bushing be periodically changed to prevent damaging wear thereto.

In one form, the pins and inserts are sized to provide a slight clearance therebetween and there is a passageway in the mold body for introducing shots of plastic molding material to the cavity. Heating the passageway generates unequal thermal expansion between the mold halves sufficient to produce an interference between the pins and inserts. The inserts can be of a plastic material to limit wear of the pins as the mold halves are moved to their closed position. The clearance between the pins and inserts can be approximately 0.001 inches and the other mold half can be run at approximately 175° F. and one mold half can be run at approximately 100° F. producing an interference of approximately 0.0035 inches between the pins and inserts.

In another form, the pins and inserts are sized to provide a slight clearance therebetween and the inserts are of a hardened steel material to provide tight alignment between the mold halves as they are moved to their closed position. The pins can have a tapered portion at their base adjacent the other mold part line surface and the top of the inserts can have a corresponding configured taper so that the pin is guided into aligned position within the insert and bushing as the mold halves move to their closed position.

The invention further details a method for maintaining proper alignment between mold halves held by a press in a molding unit. The method includes the steps of providing leader pins on one of the mold halves and bushings generally aligned with the pins on the other mold half, mounting a cylindrical insert in each of the bushings with the bushing in their mold half, closing and opening the mold halves in each molding cycle such that the leader pins are extended into and retracted out from the inserts as the mold halves close and open with the pins and inserts properly aligning the mold halves as they are closed, running the molding unit until the bushing inserts are worn, and then replacing the worn bushing inserts by disconnecting them from the bushing body, such as, by unscrewing them and connecting a new insert to the bushing body as by threading the new insert into the bushing body. In the preferred method, the cooperating threads on the guide bushings and inserts are threaded while in their mold half to securely mount the inserts in the bushings.

The method may further include the steps of running the molding unit the predetermined number of closing and opening cycles, replacing the inserts with new inserts, and running the molding unit up to the predetermined number of closing and opening cycles with the new inserts while maintaining the alignment between the pins and new inserts and without substantial wearing of the pins and new inserts. The replacing step can include the step of opening the mold halves and installing the new inserts with the mold halves left in the press.

DETAILED DESCRIPTION OF THE PREFERRED EMBODIMENTS

Figure 1:
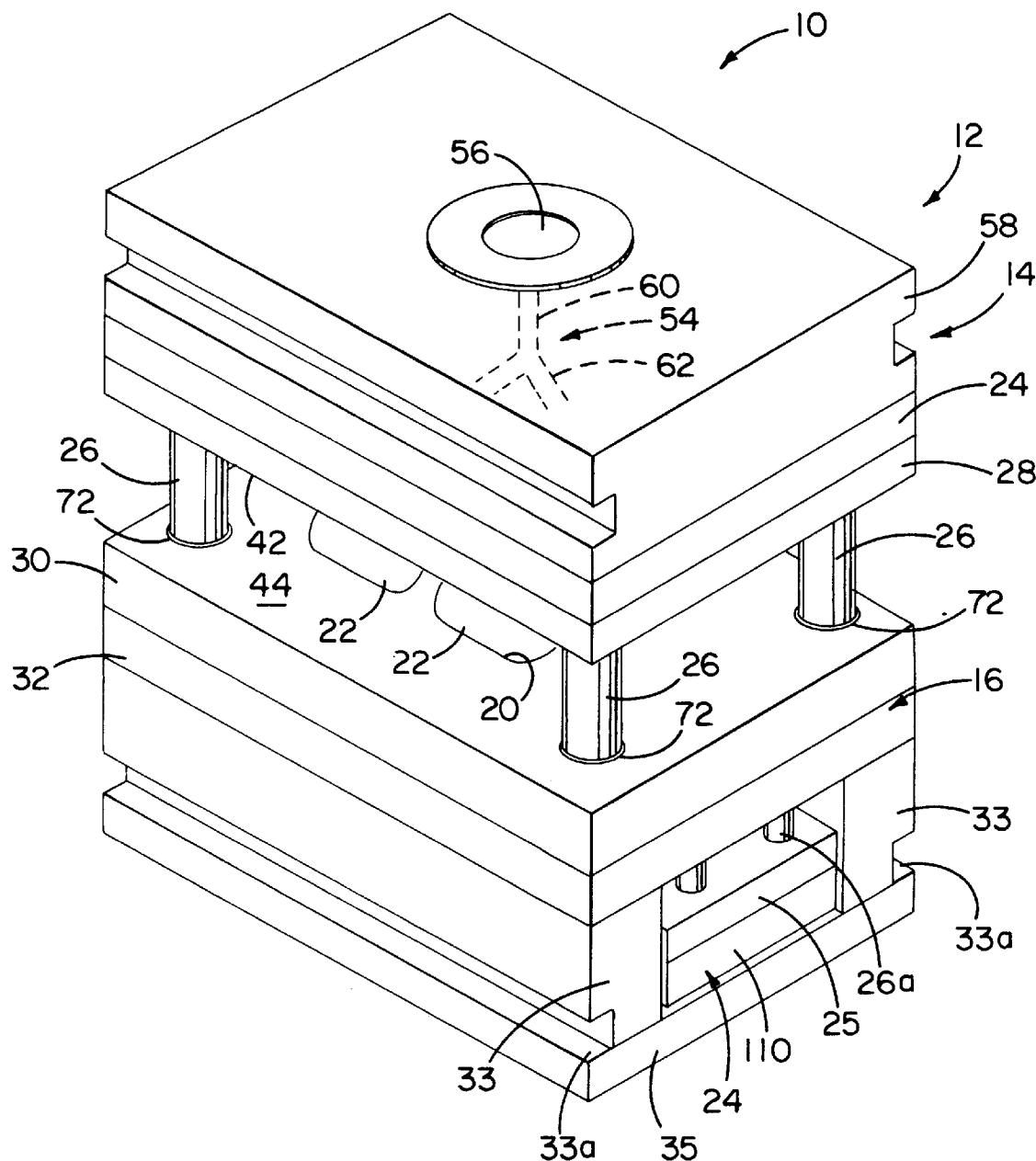
FIG. 1 is a perspective view of a mold body including a pair of mold halves with a part ejecting mechanism and having guiding components which align the mold halves as they undergo closing and opening cycles and which guide the ejector plate assembly of the ejector mechanism for movement.
Figure 2:
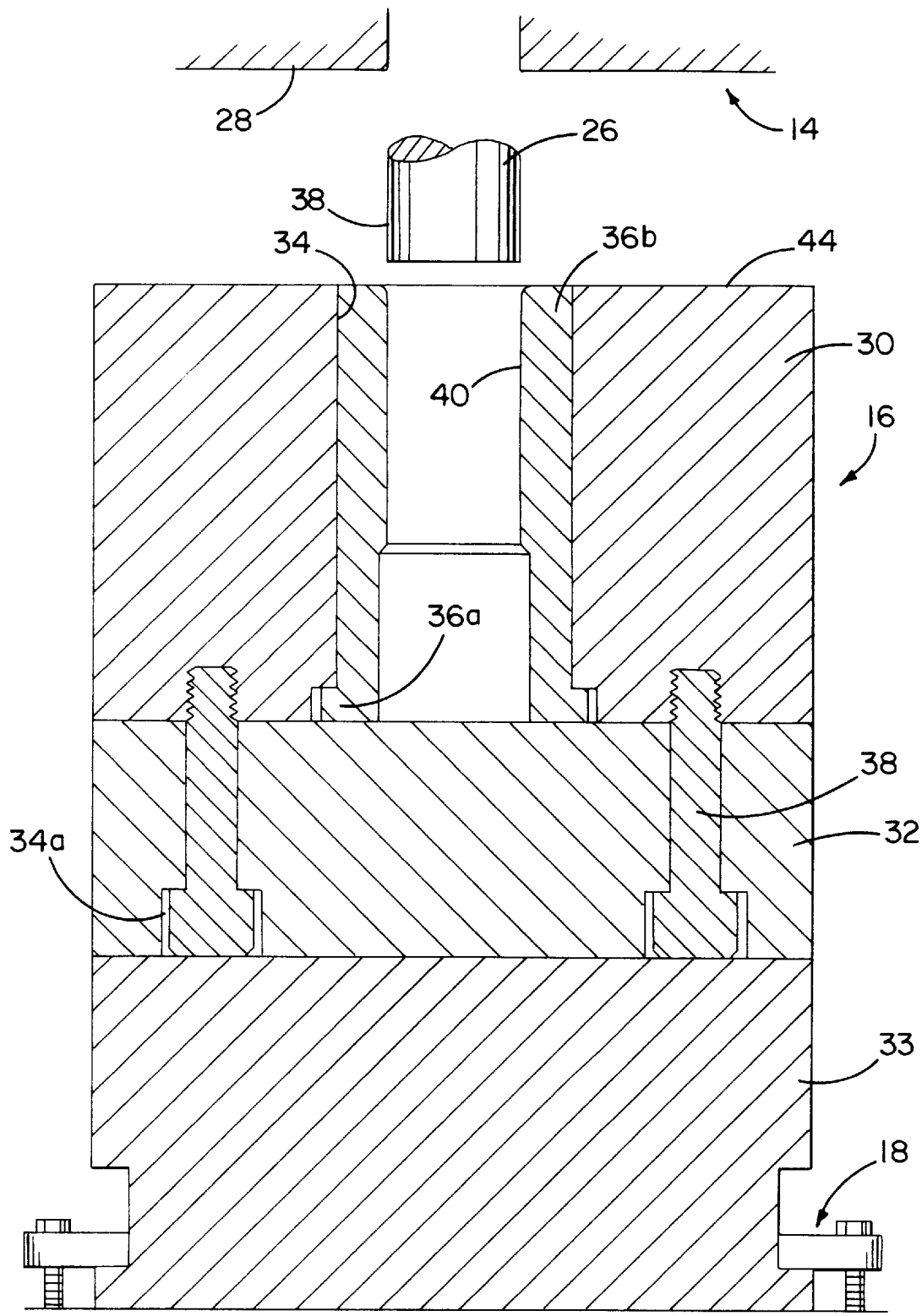
FIG. 2 is a side elevational view of a prior conventional bushing in the lower mold half and its corresponding leader pin.

Referring to FIGS. 1 and 2 and for describing the current molding units and molding operations therewith with which the present invention can be retrofit and utilized, an injection molding unit generally designated 10 is depicted with the molding unit 10 including a mold body 12 having a pair of mold halves 14 and 16. The mold halves 14 and 16 are held in a mold press with a holding clamp mechanism 18 illustrated schematically in FIG. 2. The press is operable to move the mold halves 14 and 16 together where they cooperate to form at least one cavity 20 for forming part 22. To remove the part 22, the press opens the mold halves 14 and 16, and an ejector mechanism 24 separates the part 22 from the cavity 20 by an ejector plate assembly 25 comprising stationary ejector pins 26a (FIG. 11) which guide bushings which are mounted on a moveable ejector plate. With each closing and opening repetition, the molding unit 10 undergoes a single molding cycle.

The mold halves 14 and 16 are vertically oriented relative to one another with the upper mold half 14 being stationary and the lower mold half 16 being movable by the press form an open position to a closed part-forming position relative to the upper mold half 14. The upper mold half 14 has four leader alignment pins or posts 26 of a hardened steel material which are mounted in the lower cavity plate 28 at the corners thereof. The lower mold half 16 includes an upper plate 30 secured to an intermediate support plate 32 which, in turn, is mounted on a pair of ejector spacer rails 33. The ejector rails 33 are mounted on a bottom support plate 35. The core plate 30 is provided with hollows 34 at the corners thereof in which conventional hardened steel bushings 36 can be mounted in alignment with the leader pins 26. The hollows 34 have a lower enlarged diameter bore portion 34a and the bushings 36 are provided with a corresponding annular flange foot 36a as best seen in FIG. 2. Thus, the bushings 36 can be pressed into the mold hollows 34 with their annular foot 36a seating in the enlarged bore 34a of the mold hollow 34. To securely maintain the bushings 36 in the hollows 34, the support plate 32 is fastened as by fastener 38 to the bottom of the upper core plate 30 thereby closing the enlarged bore portion 34a and capturing the bushing foot 36a therein; thereby preventing the bushings 36 from dislodging from the hollows 34 as by repeated cycling of the mold unit 10 and frictional engagement of the leader pins 26 with the bushings 36. The leader pins 26 can be pressed into and mounted to the cavity plate 28 in a similar fashion. In this manner, the leader pins 26 cooperate with and are received in the bushings 36 to maintain proper alignment between the mold halves 14 and 16 as the molding unit 10 is cycled. Likewise, the pins 26a cooperate with the bushings 36a to maintain alignment of the ejector plate assembly 25 as it is cycled.

The leader pins 26 have a cylindrical outer surface 38 and the bushings 36 are provided with a cylindrical inner surface 40 with the clearance between the radius of the leader pin cylindrical surface 38 and the bushing cylindrical surface 40 typically being approximately 0.001 inches. Thus, through the normal tolerances built into a molding unit, there will be significant frictional engagement between the pin outer surface 38 and the bore inner surface 40 as they perform their alignment function when the lower mold half 16 is opened and closed to complete a typical molding cycle. These surfaces tend to progressively wear as the molding unit 10 is cycled with the rate of wear varying based on a number of factors including misalignment of the press platens, the operating temperature differential between mold halves 14 and 16 and whether lubrication is used, etc. As previously discussed, such wearing is undesirable for a variety of reasons such that when the surfaces wear, the pins 26 and bushings 36 must be replaced. Replacing pins 26 and bushings 36 is a difficult and time consuming task. For example, to replace conventional bushings 36, the mold half 16 must be released from the clamp mechanism 18 of the press to be removed from the press. Then, the core mold half 16 must be disassembled including separation of the plates 30 and 32. Thereafter, the bushings 36 are pounded out from the mold hollows 34 in the upper core plate 30. As molders do not particularly care for this extra work and the downtime associated therewith, they often turn down the leader pins or open the bushings such that they do not make contact during molding cycles. This is not satisfactory in that without guiding engagement between the pins 26 and bushings 36, they no longer serve their alignment function. To replace the ejector bushings 36a, the mold must be disassembled, and the bushings 36a must be pounded out, in a similar manner, before they can be demounted and replaced.

Figure 3:
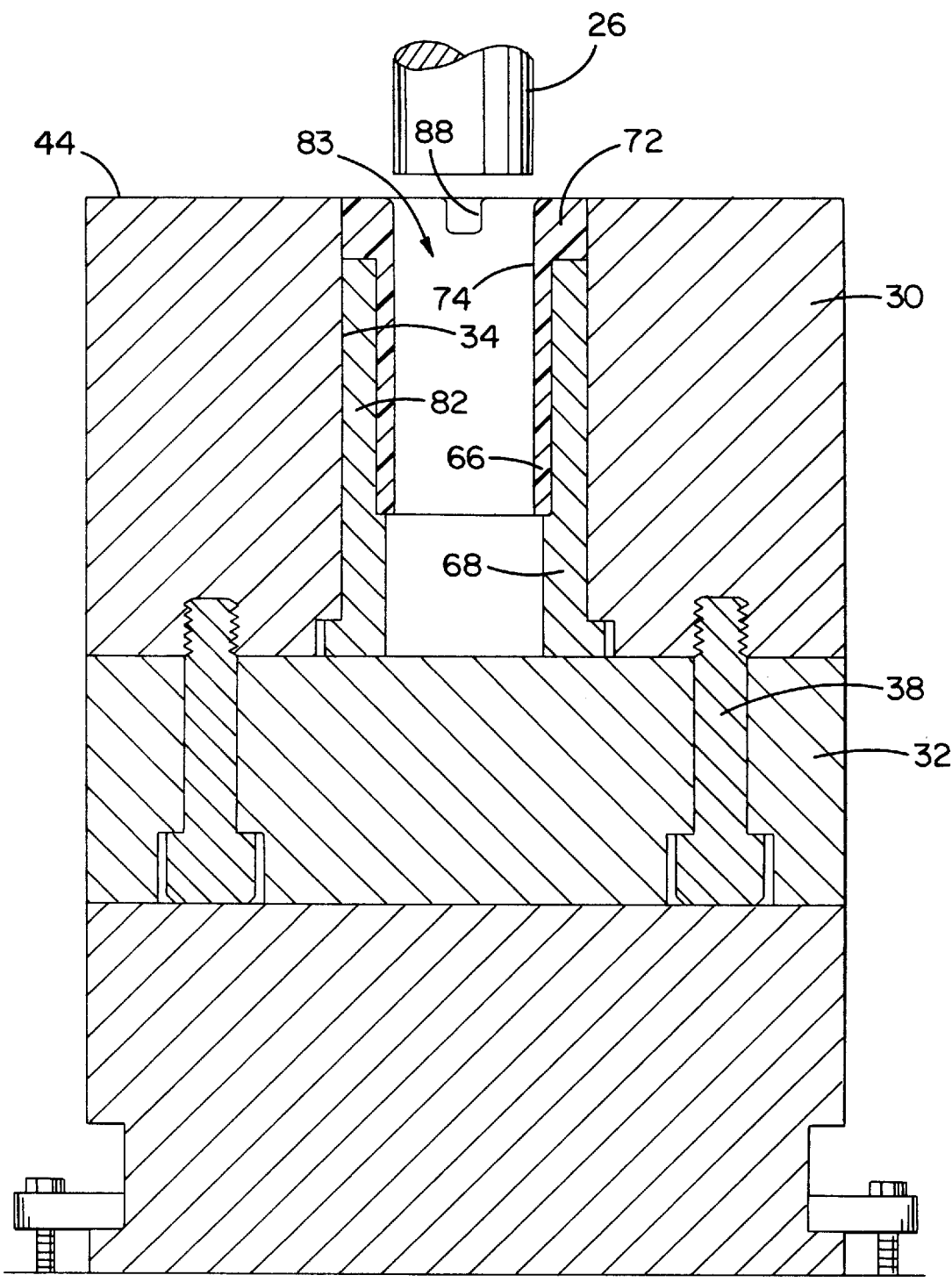
FIG. 3 is a side elevational view of a leader pin on the upper mold half and a bushing mounted in the lower mold half with a cylindrical bushing insert mounted therein.

Referring to FIGS. 1 and 3, a multi-cavity mold body 12 utilizing the guiding mechanism of the present invention is illustrated. In the form shown in FIG. 1, the mold body 12 has two cavities 20 for producing two parts 22 with each molding cycle. Manifestly, the mold body 12 may be a single mold cavity and may have various sizes and shapes from that illustrated herein. When the mold halves 14 and 16, and more particularly the cavity lower plate 28 and upper plate 30 are brought together, their respective plate surfaces 42 and 44 cooperate to form the pair of mold cavities 20. with a part line defined at the juncture of the surfaces 42 and 44. The heated plastic molding material is injected into a passageway shown schematically and generally designated as 54 in FIG. 1 extending through the upper mold half 14 and leading to the cavities 20. The heated molding material is injected into a sprue opening 56 formed in the top of top clamp plate 58 which leads to the passageway 54. In multi-cavity molds, such as mold body 12, sprue channel 60 will typically lead to intermediate channels or runners 62, which carry the heated molding material from the sprue channel 60 to the gates of the cavities 20.

In hot runner molding, the stationary mold half 14 can be provided with a hot runner block 64 between the cavity plate 28 and the top clamp plate 58. As the hot cavity half 14 is run at a higher temperature than the cold core half 16, the unequal thermal expansion therebetween can cause the pins 26 and their associated bushings 36 to become misaligned producing interference between their engaging surfaces during molding cycles, as described earlier.

In accordance with the present invention, cylindrical inserts 66 are provided which can be mounted to bushing body 68 slightly modified from the conventional bushings 36 to accept the inserts 66, as described more fully herein. The inserts 66 are easily replaced and interchanged with each other in the bushing bodies 68. Since the bushing bodies 68 utilized with the removable inserts 66 herein conform to the sizes of standard mold hollows 34 and bushings 36 used in current mold bodies, they can be mounted in the mold hollows 34 similar to conventional bushings 34. With the inserts 66 herein, a molder can replace old inserts 66 with new inserts 66 if wear is a problem while leaving the undamaged bushing bodies 68 in their mold hollows 34. In addition, the top of the inserts 66 are generally flush with the upper plate top surface 46 so that they do not extend above the part line and accordingly do not require that the cavity plate underside surface 42 be machined for clearance. Thus, with the removable insert 66 and bushing body 68 herein, a molder can easily replace inserts 66 before friction between the pins 26 and inserts 66 begins to cause damaging wear to these components and, in this manner, effect a preventative maintenance program for these components. Replacing the inserts 66 is a relatively easy procedure and does not require that the bushing bodies 68 be removed from their mold hollows 34 and thus does not require that the lower mold 14 itself be disassembled. Accordingly, the inserts 66 can be replaced without releasing the clamping mechanism 18 from the clamp slots 33a formed in the ejector spacer rails 33 leaving the mold in the press.

Figure 4:
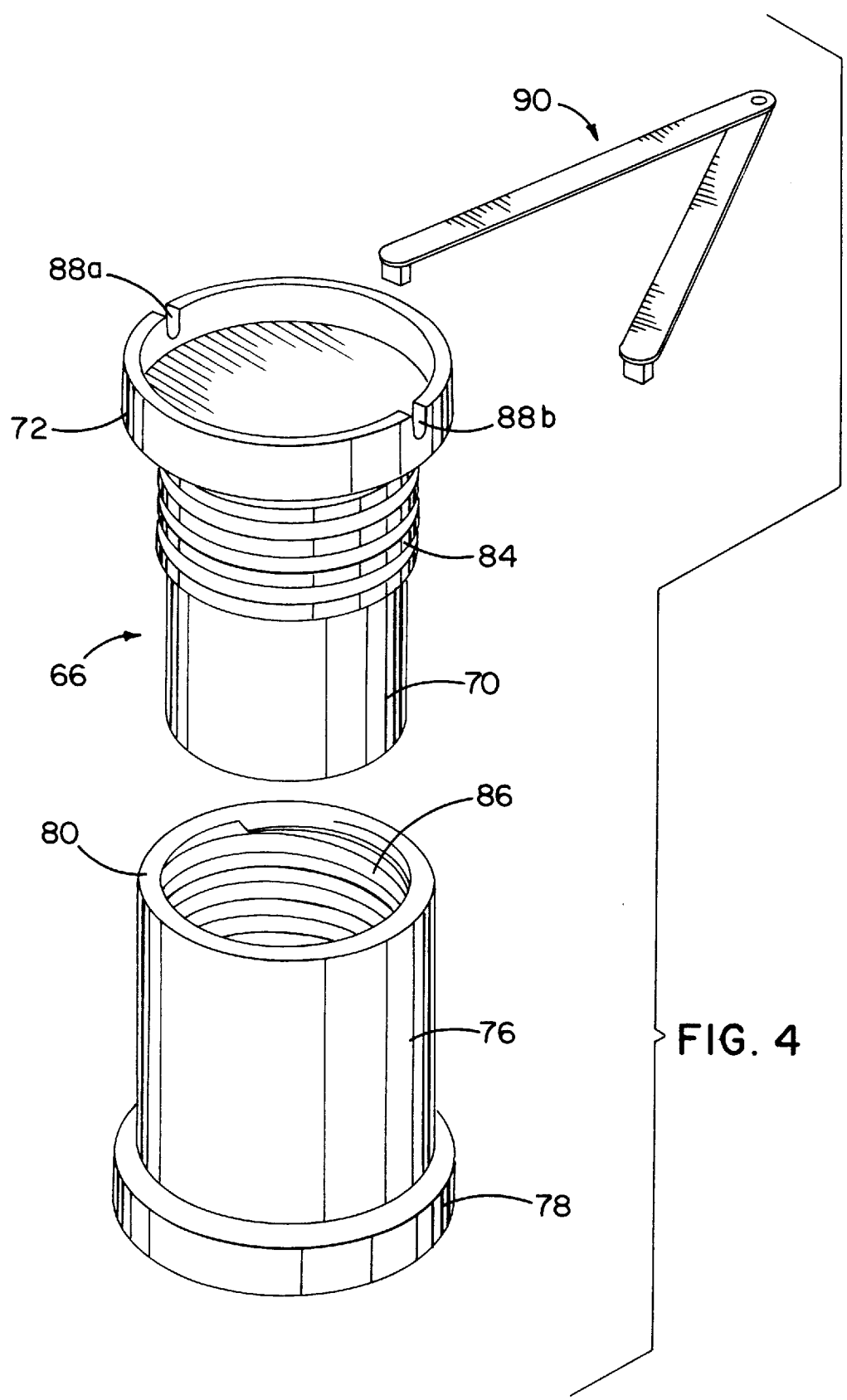
FIG. 4 is an enlarged perspective view of the guiding mechanism of FIG. 1 showing an internally threaded bushing body, an externally threaded bushing insert and a spanner wrench for fitting the bushing insert into its bushing and for removal therefrom.
Figure 5:
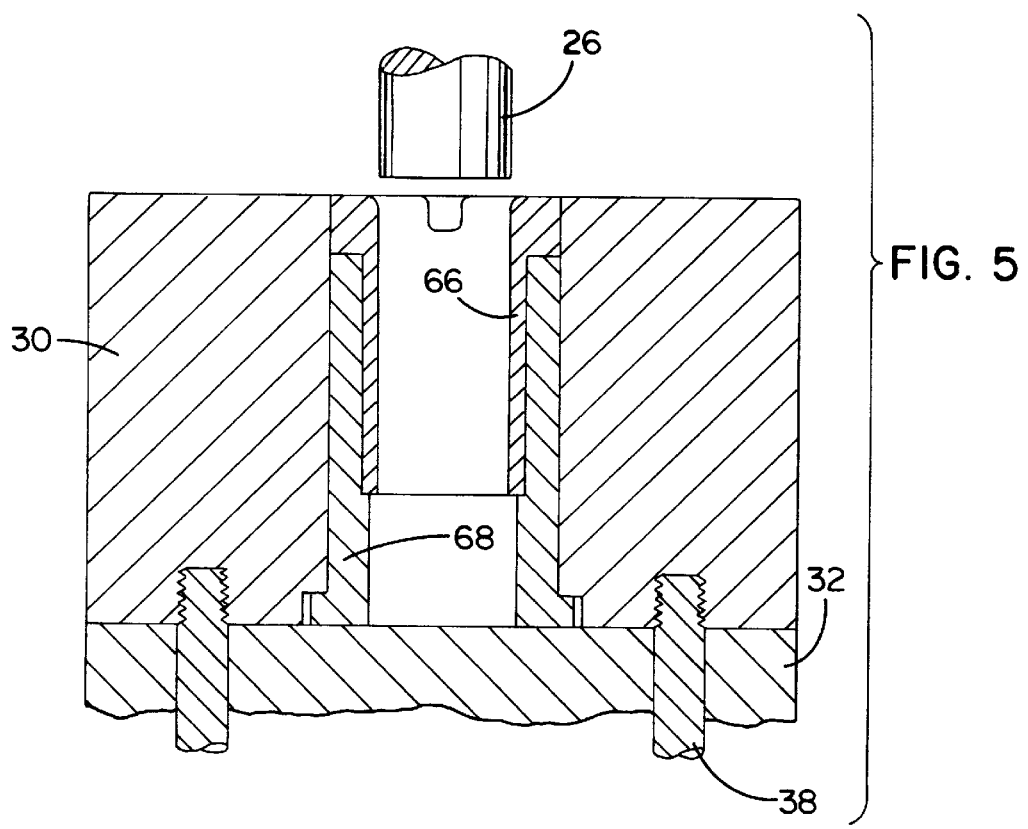
FIG. 5 is a side elevational view of the guiding mechanism according to the present invention with the bushing insert formed from a metallic material.

More specifically and referring to FIGS. 3 and 4, the inserts 66 have a cylindrical shank 70 and an upper annular rim 72 which together define an inner guide surface 74 for the leader pins 26. The bushing body 68 is similar to conventional bushings 36 in that it has a main cylindrical body portion 76 and a lower annular foot 78. The length of the main body 76 can be slightly shorter than the length of conventional bushings 36 so that the top 80 thereof is recessed below the part line surface 44. In this manner, when the inserts 66 are mounted to the bushings 68, the upper annular rim 72 of the inserts 66 will seat on the main cylindrical body top 80 with the top of the rim 72 substantially flush with the part line surface 44, as best seen FIG. 3. In addition, the bushing bodies 68 can be provided with thinner wall upper portions 82, such that the thinner wall upper portion 82 and the main cylindrical body 76 of the insert 66 taken together is approximately the same as the thickness of the upper portion 36b of conventional bushings 36 with the surface 74 defining an annular bore 83 in which the leader pins 26 are alternately extended and retracted. Thus, the diameter across the inner guide surface 74 of the inserts 66 is substantially the same as the diameter of the inner surface of the conventional bushings upper portions 36b. In this manner, the insert 66 and bushing body 36 are well adapted to be retrofit into current molds without changing the designs of the molds or their component parts, including the leader pins 26 and mold hollows 34.

For ease of installation and removal of the cylindrical inserts 66, removable insert 66 is provided with upper external threads 84 and thinner wall portion 82 of the bushing bodies 68 is provided with cooperating upper internal threads 86. In this fashion, the inserts 66 can be screwed into and out of the bushings 68 relatively easily and quickly. To facilitate such installation and removal, the upper annular rim 72 of the inserts 66 can be provided with the pair of opposite upper slots 88a and 88b in which a torquing tool 90, such as the spanner wrench shown in FIG. 4, can be fit to screw the inserts into and out from the bushing bodies 68.

With the removable inserts 66 and the bushing bodies 68, the molder can readily determine the maximum number of cycles an insert 66 can withstand while providing proper alignment between the mold halves 14 and 16 for a given application, such as the hot runner molding application or dry application previously described. Once the appropriate number of cycles is determined for a particular insert 66, the molder can run the molding unit the predetermined number of cycles while maintaining proper alignment between the mold halves and then replace the used insert 66 with a new insert 66 without removing the bushing bodies 68 from their mold hollows 34 or the mold half 16 from the press. In this fashion, misalignment is avoided so that the efficiency of the mold cycles in producing salable articles with each cycle is improved.

An additional advantage of providing the insert 66 is that they can be supplied in a single size, i.e., the same length and diameter bore 83, for use with a specific size of bushing body 68 but formed from different materials and combinations of materials such as alloys, depending on the application parameters. So, for instance, where it is known that thermal expansion of the mold halves 14 and 16 is a factor such as in hot runner molding, the inserts can be fabricated from an engineered thermoplastic material which more readily compensates for misalignment caused by such unequal expansion over the conventional hardened steel bushings 36 currently used.

Figure 7:
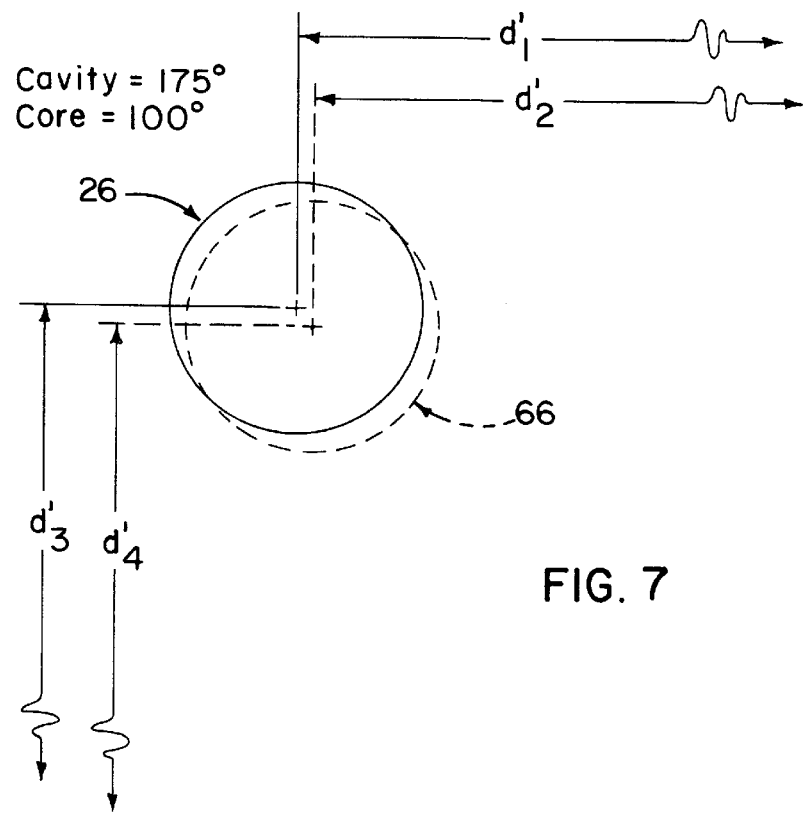
FIG. 7 is a schematic view of the interference between the leader pin and bushing insert upon unequal thermal expansion of the two mold halves.
Figure 6:
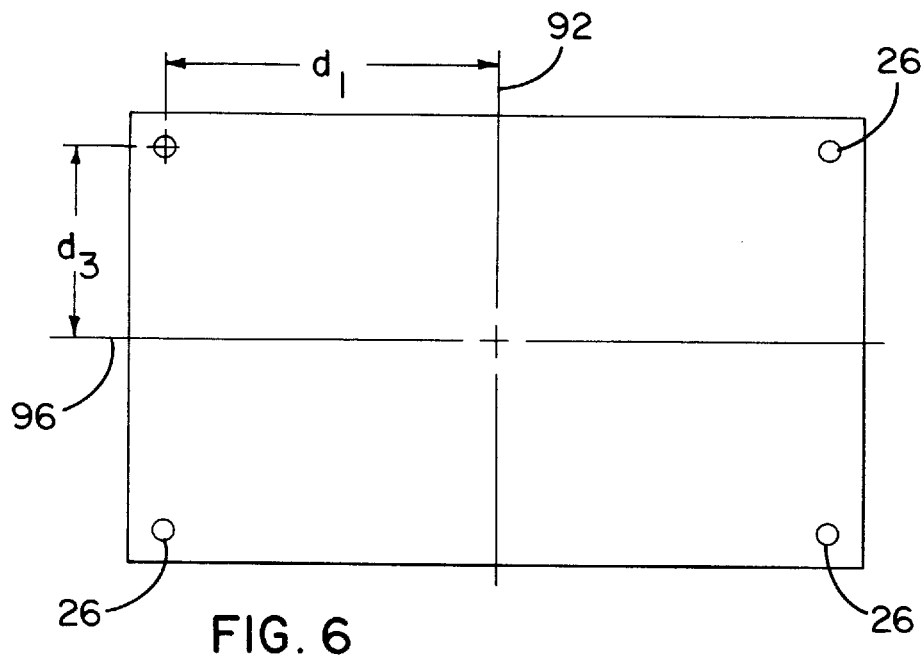
FIG. 6 is a bottom plan view of the leader pins on the upper mold half and a top plan view of the bushing inserts of the bottom mold half.
Figure 6A:
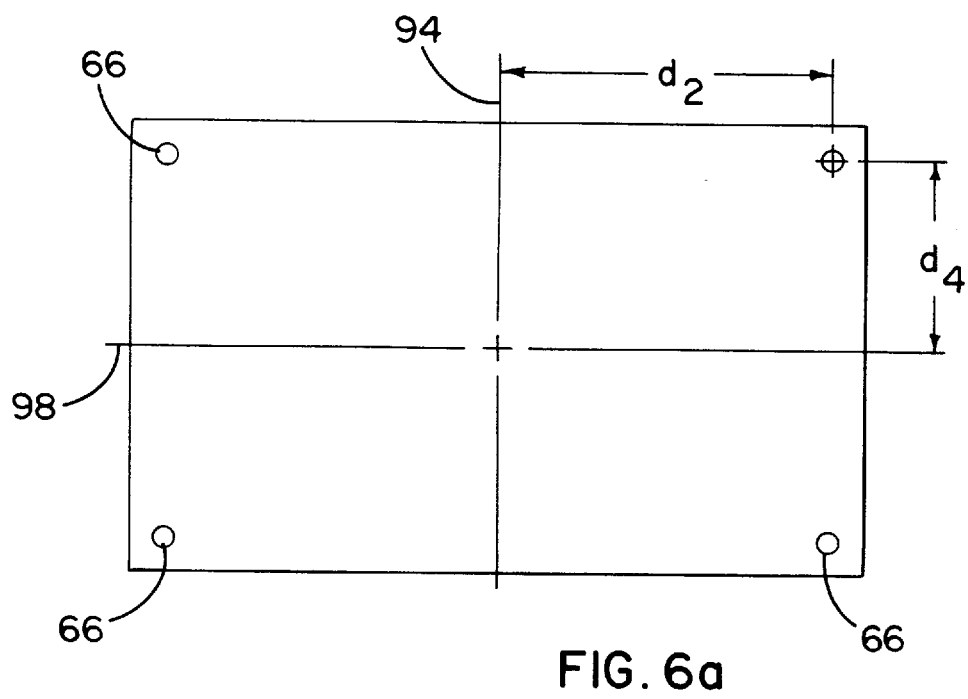
Figure 8:
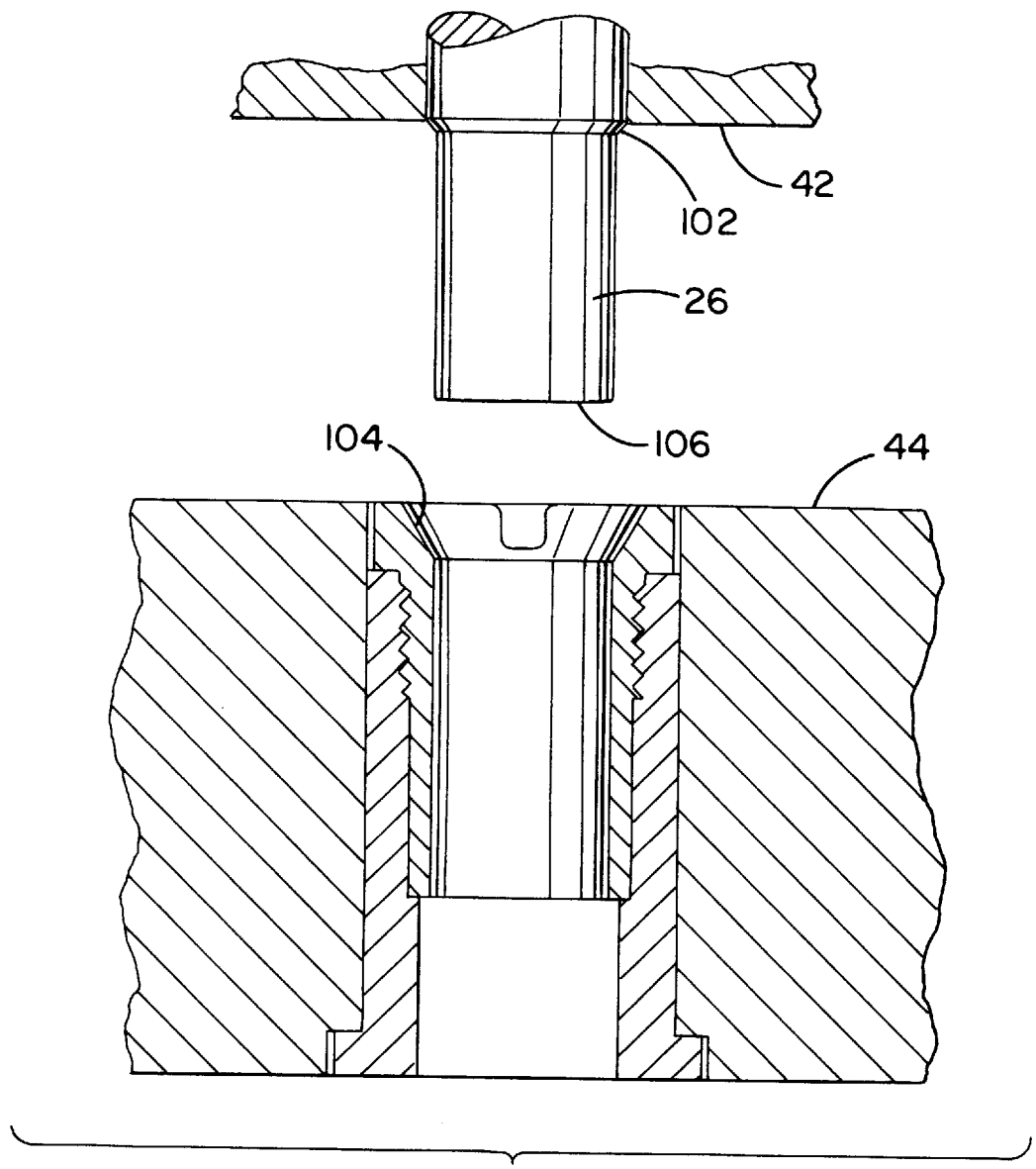
FIG. 8 is a side elevational view of a modified leader pin and insert according to the present invention showing the base of the leader pin tapered and an upper corresponding taper on the insert.

By way of example and referring to FIGS. 6 and 7, in hot runner molding where the mold base is 12 inches by 12 inches (12"×12"), the cavity half 14 is run at a temperature of 175° F. and the core half 16 is run at a temperature of 100° F. and the mold halves 14 and 16 are formed of a conventional treated steel material for mold bodies which has a coefficient of expansion of 0.000006, the following thermal expansion information was determined. X- and Y-axis measurements will be referenced to illustrate the unequal thermal expansion between the mold halves 14 and 16 with the X-axis measurements being referenced from the vertical centerline 92 of the cavity half 14 and the vertical centerline 94 of the core half 16. Similarly, Y-axis measurements will be referenced from the horizontal centerline 96 of the cavity half 14 and the horizontal centerline 98 of the core half 16.

The X-axis distance $d_1$, as measured from vertical centerline 92 to the center of the leader pins 26, is approximately 8.8125 inches and the X-axis distance $d_2$, as measured from the vertical centerline 94 to the center of inserts 66, is the same. Similarly, the Y-axis distance $d_3$, as measured from the horizontal centerline 96 to the center of the leader pins 26, is approximately 4.75 inches and the Y-axis distance $d_4$, as measured from the horizontal centerline 96 to the center of the insert 66, is the same, as shown in FIG. 6. However, when the cavity half 14 is run at 175° and the core half is run at a 100° F., there is unequal thermal expansion between the two which produces interference between the pins 26 and the inserts 66 and can cause misalignment problems with the mold halves 14 and 16. With the coefficient of expansion as previously set forth, the cavity half 14 will expand so that with the mold running, the X-axis distance $d_1'$ increases to approximately 8.822 inches and the Y-axis distance $d_3'$ increases to approximately 4.755 moving the leader pins 26 off of their original center points. With the core half 16 running slightly cooler there will be less expansion and, accordingly, less movement of the inserts 66 and bushings 68 from their original center points: the X-axis distance $d_2'$ increases to approximately 8.818 inches and the Y-axis distance $d_4'$ increases to 4.753 inches. Thus, the center point of the leader pins 26 is caused to move relative to the insert 66 a distance of 0.0045 inch, as best seen in FIG. 7 with the pin 26 shown in solid line and the insert 66 in dashed lines. Since, as previously mentioned, the clearance between the pins 26 and the inserts 66 is approximately 0.001 inches, the thermal expansion between the mold halves 14 and 16 is sufficient to produce interference between the pins 26 and inserts 66 in overlap area 100 of approximately 0.0035 inches in this instance.

Obviously, utilizing inserts 66 that are made from a hardened steel material similar to the prior bushings 36, would tend to cause wear between the surfaces of the leader pins 26 and the steel inserts 66, whether lubrication is used or not. If this occurs, the present invention allows the molder to simply replace the steel insert 66 with a new insert 66 to improve the durability of the insert 66 and increase the number of molding cycles that can be run before wear occurs, which causes misalignment between the mold halves 14 and 16 and requires replacement of the inserts 66. On the other hand, if thermal expansion is not a significant problem in generating interference between the pins 26 and inserts 66, an insert 66 from a different series can be utilized with the leader pins 26 to maintain alignment between the mold halves 14 and 16 during molding cycles. Again, with the inserts 66, be they formed from steel or plastic or other suitable materials depending on the application, the molder can, through trial and error, determine how many cycles the insert 66 can withstand for the particular application and then replace the insert 66 with a new insert 66 once that predetermined number of cycles has been reached. As will be apparent, the replaceable cylindrical inserts 66 and their associated bushings 68 herein provide a molder with significant flexibility in determining for themselves which types of inserts are desirable for specific applications based on their equipment and operating conditions, including temperatures, mold sizes and types, and whether lubrication is used. Thus, as the application varies, so may the material with which the insert 66 is formed to better suit the performance characteristics and degree of alignment required in a given application.

In addition to fabricating the inserts 66 with different materials, the shape can be varied to better accommodate the particular application in which the molding unit is run with one variation in design being illustrated in FIG. 9 which is ideally suited for applications where problematic thermal expansion will not occur and tight alignment is required. In this case, the leader pins 26 can be provided with a tapered base portion 102 adjacent the cavity plate surface 42 and the insert 66, preferably formed of a hard metallic material, can have a correspondingly tapered inner annular rim surface 104. In practice, when the lower mold half 16 is moved upwardly, the leading end 106 of the leader pin 26 may initially engage inner tapered surface 104 of the insert 66. As the mold half 16 continues its upward movement to the closed part forming position, the leading end 106 will be guided by the tapered surface 104 to mate the cylindrical outer surface 38 of the pin 26 with the inner guide surface 74 of the insert 66 until the tapered base 102 of the pin 26 seats on the tapered rim surface 104. In this manner, the pin 26 is guided into proper alignment with the insert 66 reducing the shock loads generated by potential interference between the pin 26 and insert 66.

Figure 9A:
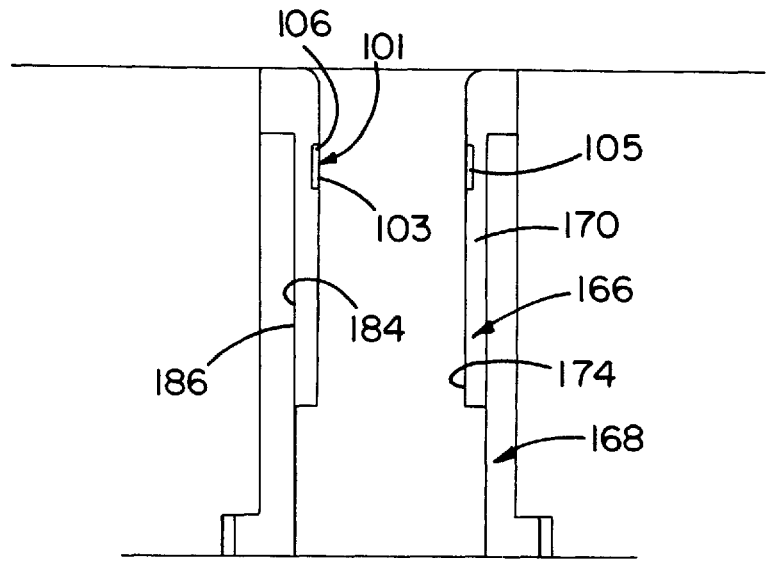
FIG. 9A is a side elevational view of the bushing insert formed from an alloy material and having an insert ring formed of a low coefficient of friction plastic material.
Figure 9B:
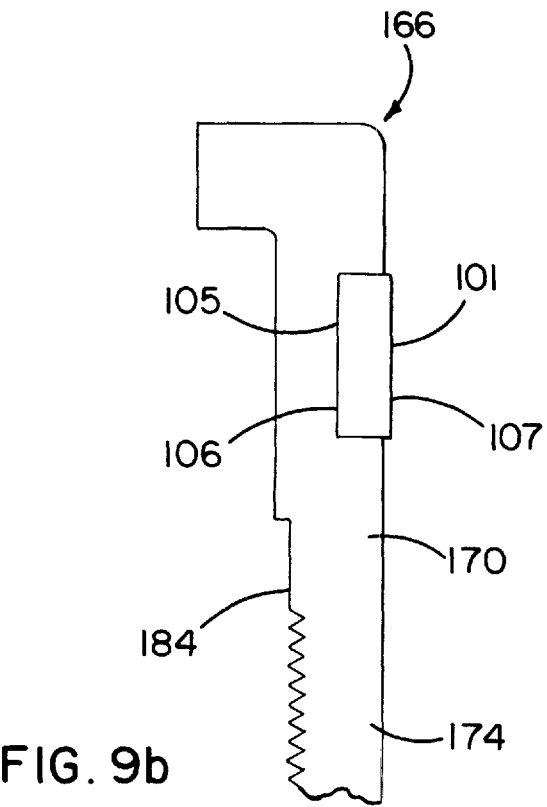
FIG. 9B is an enlarged side elevational view of the insert ring and bushing insert.

FIG. 9A illustrates a preferred embodiment of the invention where a bushing insert 166 is provided with a lubricant material and is detachably mounted in a bushing body 168. The bushing body 168 has internal threads 186; and the insert has cooperating, mating external threads 184. The insert 166 and bushing body 168 cooperate as above-described for the insert 66 and bushing body 168. In the embodiment of FIGS. 9A and 9B, the insert 166 is provided with an internal lubricant body 101 of plastic or the like such as PTFE (Teflon®) that rubs onto the pin 26 or 26a and coats the pin surface with the lubricating material to decrease friction and wear of the pin. Other plastic or other materials which lubricate and coat the pin may be used other than Teflon®. Preferably, the lubricant body is formed with an internal diameter surface 103 that is smaller in diameter than the diameter of the pin so that the metal pin preloads the lubricant body to press there against with force to assure that the lubricant wears off and coats the pin's cylindrical surface. During usage, the lubricant body will wear down to the diameter of the pin. The lubricant body will not take side loads, but this is the function of the metal insert shank 170 and its guide surface 174. Preferably, the lubricating body 101 is in the form of an annular ring 105 that is nested in an annular groove 106 formed in the internal surface of the insert shank. Herein, the illustrated Teflon® ring has an inner surface 107 that projects radially inward by about 0.002 inch from the cylindrical bore surface 174 of the insert.

The preferred insert 166 is made of a porous metal material that will receive and be coated with the lubricant, such as Teflon, from the coating on the surface of the pin 26 or 26a, as the pin rubs along the porous metal surface 174 of the insert. The preferred insert body is made of aluminum bronze; but, other porous or non-porous metal materials can be used for the insert. The aluminum bronze is preferred because it can withstand high heat and will grab and hold the lubricant coating and thus assist in lowering the friction between its surface 174 and the sliding cylindrical surface of the pin 26 or 26a.

Figure 10:
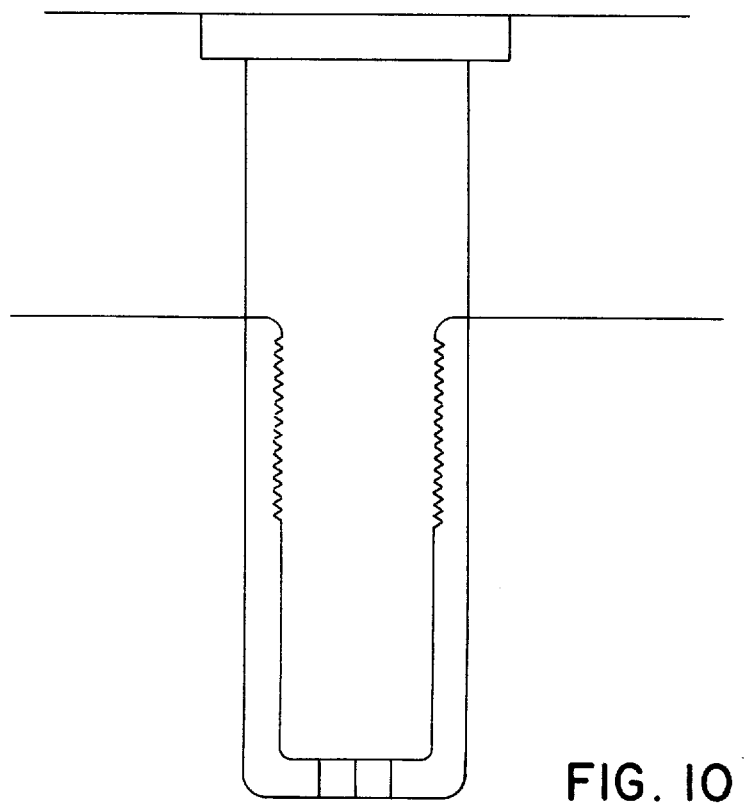
FIG. 10 is a side elevational view of the leader pin configured for mounting a pin insert.
Figure 10A:
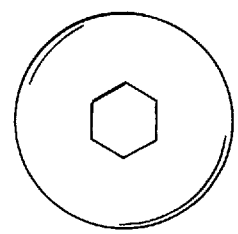
Figure 11:
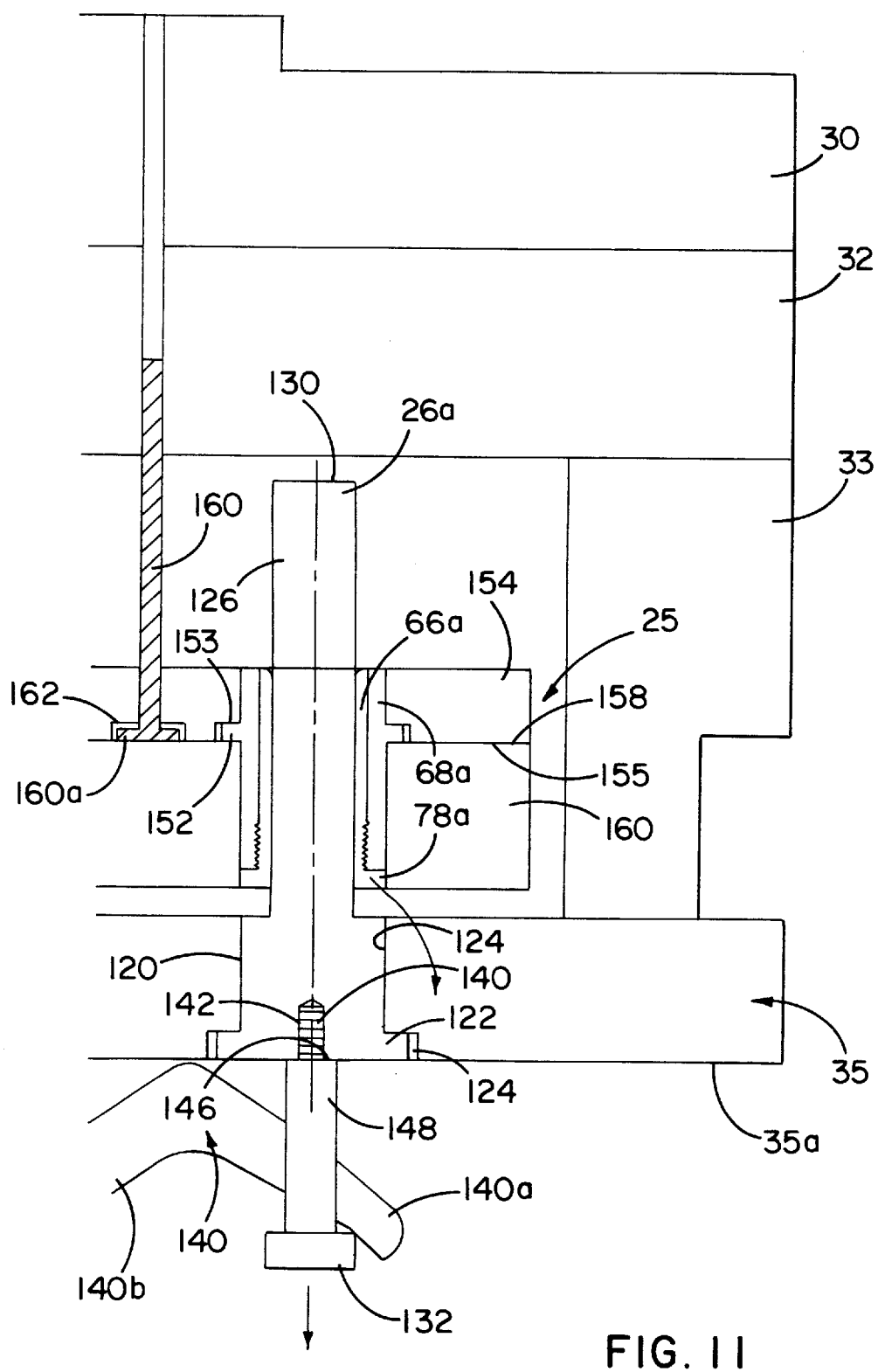
FIG. 11 is an enlarged side elevational view of the ejector mechanism including the ejector plate assembly mounted for movement on a return post with the plate assembly including a bushing with a bushing insert mounted therein.

The ejector plate assembly 25 and its bushings 36a and leader pins 26a will now be described in connection with FIGS. 10 and 11. As best seen in FIG. 1, there is a space 110 wherein the ejector plate mechanism 25 is located. When the mold is properly cycled, an underside 35a of the bottom support plate 35 of the mold assembly is accessible to allow removal of an insert 66a from a bushing body 68a of a bushing. As best seen in FIG. 11, a stationary, upstanding leader pin 26a is secured to the bottom, stationary support plate 35 by being press fitted therein at a bore 120 in the bottom plate. The pin 120 has a lower flange 122 that is set in a circular recess 124 in the underside 35a of the bottom support plate. The leader pin 26a has a smaller diameter upper end portion 126, in this instance, that projects into and through the bushing insert 66a and terminates at an upper end surface 130.

To pull the leader pin 26a from the bottom plate 35, it is preferred to be able to mount a headed coupling pin 132 to a lower flange end of the leader pin, and to use a pry bar 140 or other force applying tool to pull the leader pin downwardly to remove its large diameter portion 120 from the circular bore 120 in the plate 35. To this end, the lower end of the ejector guide pin has a coupling means preferably in the form of a small, internally threaded hole 142 that receives a small, externally threaded end 144 on the coupling pin 132. When it is desired to pull the leader pin 26a, the coupling pin 132 is brought to the leader pin in the space 110 and is threaded until a lower end 146 of its shank 148 abuts the lower surface of the leader pin 26a. Then, a pry bar tool 140, such as a bent end 140a of the pry bar is fulcrummed against lower surface 35a of the bottom support plate to exert a downward force to pull the leader pin 26a when a lever end 140b is pushed toward the bottom plate. Other tools such as hydraulic jacks or the like, could be coupled to the pin 26a to pull it from the bore 124 in the bottom plate. After removal of the pin and replacement of the bushing, the same or a new pin 26a is pounded back into the bore 120.

After removal of the leader pin 26a (FIG. 11), the underside of the insert 66a is accessible through the bore 120 vacated by the pin. More specifically, a lower flange end or foot 78a that has slots therein may receive the rotatable tool and the insert may be screwed downwardly. Thus, external threads 84a on the insert can be unthreaded from the internal thread 86a leaving the bushing body 68 in the ejector plate assembly 25. The lower end of the replaceable insert is removable through the bore 120 in the bottom support plate 35. The bore 120 is larger in diameter than the diameter of the insert foot 78a, so that the latter may be removed through the bore 120 and a new insert can be pushed upwardly through the bore and threaded into the bushing body 68a. Herein, the bushing body 68a is provided with a central, annular flange 152 that is received in an annular recess 153 in a bottom surface 155 of the upper plate 154. The flange 152 abuts an upper surface 158 of a lower plate 160. The upper plate and lower plates 154 and 160 abut at the interface and are secured together.

The ejector pin 160 to push the molded part from the mold cavity is shown with an enlarged head end 160a fitted in a recess 162 in the upper plate's lower surface 155. An upper end 160b of the ejector pin projects into and reciprocates in a bore in plates 32 and 30 of the lower mold half 16. Thus, it will be seen that the leader pins 26a and bushing insert 66a may be removed and replaced from an ejector assembly without a costly tearing apart of the mold.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. In a mold body mounted in a mold press for molding plastic having a closed position for molding a part and an open position after molding the part, the combination comprising:

a first mold portion having a first parting line surface;

a first cavity defining surface in the first mold position at a parting line;

a second mold portion having a second parting line surface engageable with the first parting line surface when the mold is closed for molding a part;

a second cavity defining surface in the second mold portion at the parting line;

a guide pin on the first mold portion extending across the first parting line surface;

a bushing body extending inwardly from the second parting line surface in the second mold portion and having a bore generally aligned with the guide pin;

a replaceable insert mounted in the bore on the bushing body and extending to the parting line surface on the second mold half; and having an insert bore to receive the pin and to guide the pin for reciprocating movement relative to the bushing body;

the releasable insert being telescoped into the bushing body and removed from the telescoped relationship for replacement by pulling the replaceable insert outwardly across the parting line surface of the second mold half while the mold is in the open position and the second mold half is in the mold press; and a releasable interconnection between the insert and the bushing body to allow a disconnection of the insert and its replacement with a second replaceable insert of the same size as the first insert in the bushing body while the mold is in the open position without removing the mold body from the mold unit.

2. In a mold body mounted in a mold press for molding plastic and having first and second portions movable toward and from each other, the combination comprising:

a guide pin on the first mold portion;

a bushing body recessed in the second mold portion and having a bore generally aligned with the guide pin;

a replaceable insert mounted in the bore on the bushing body and having an insert bore to receive the pin and to guide the pin for reciprocating movement relative to the bushing body; and a releasable interconnection between the insert and the bushing body to allow a disconnection of the insert and its replacement with a second replaceable insert of the same size as the first insert in the bushing body without removing the mold body from the mold unit;

the releasable interconnection comprising an internal thread on the bushing body and external threads on the inserts threadingly received in the bushing body to allow the inserts to be interchanged with the bushing body in the second mold portion and with the second mold portion held by the mold press.

3. The mold body of claim 2 wherein the replaceable inserts have slots formed therein to allow a torquing tool to engage in the slots and screw and unscrew the inserts into and out of the bushing body.

4. In a mold body mounted in a mold press for molding plastic and having first and second portions movable toward and from each other, the combination comprising:

a guide pin on the first mold portion;

a bushing body recessed in the second mold portion and having a bore generally aligned with the guide pin;

a replaceable insert mounted in the bore on the bushing body and having an insert bore to receive the pin and to guide the pin for reciprocating movement relative to the bushing body; and a releasable interconnection between the insert and the bushing body to allow a disconnection of the insert and its replacement with a second replaceable insert of the same size as the first insert in the bushing body without removing the mold body from the mold unit;

the second replaceable insert being formed of a different material than the first insert.

5. The mold body of claim 4 wherein the first insert may be formed from a metallic material and the second insert may be formed from a plastic material to suit a particular series of conditions.

6. The mold body of claim 5 wherein the first and second inserts each have an internal bore extending lengthwise through the inserts with the bores of the first and second inserts being of equal diameter and length.

7. The mold body of claim 6 wherein the guide pin has a cylindrical outer surface with a first predetermined radius and the bores of the replaceable inserts have a second predetermined inner radius with the first predetermined radius less than the second predetermined radius by approximately 0.001 inches.

8. The mold body of claim 6 wherein the mold portions are first and second halves of a mold;

the mold halves defining a part line therebetween in the closed position and the bushing body; and the insert does not extend beyond the part line.

9. In a mold body mounted in a mold press for molding plastic and having first and second portions movable toward and from each other, the combination comprising:

a guide pin on the first mold portion;

a bushing body recessed in the second mold portion and having a bore generally aligned with the guide pin;

a replaceable insert mounted in the bore on the bushing body and having an insert bore to receive the pin and to guide the pin for reciprocating movement relative to the bushing body; and a releasable interconnection between the insert and the bushing body to allow a disconnection of the insert and its replacement with a second replaceable insert of the same size as the first insert in the bushing body without removing the mold body from the mold unit;

the guide pin having a tapered portion at the base of the pin adjacent the first mold and the top of the inserts having a correspondingly configured taper so that the guide pin is guided into aligned position within the insert and bushing as the mold halves move to their closed position.

10. In a mold body mounted in a mold press for molding plastic and having first and second portions movable toward and from each other, the combination comprising:

a guide pin on the first mold portion;

a bushing body recessed in the second mold portion and having a bore generally aligned with the guide pin;

a replaceable insert mounted in the bore on the bushing body and having an insert bore to receive the pin and to guide the pin for reciprocating movement relative to the bushing body;

a releasable interconnection between the insert and the bushing body to allow a disconnection of the insert and its replacement with a second replaceable insert of the same size as the first insert in the bushing body without removing the mold body from the mold unit;

the first portion and second portion comprising an ejector assembly;

said guide pin being replaceably mounted for removal from a bore in the first mold portion while the ejector assembly remains in the mold; and said insert being removable through the bore vacated by the guide pin.

11. In a mold body mounted in a mold press for molding plastic and having first and second portions movable toward and from each other, the combination comprising:

a guide pin on the first mold portion;

a bushing body recessed in the second mold Portion and having a bore generally aligned with the guide pin;

a replaceable insert mounted in the bore on the bushing body and having an insert bore to receive the pin and to guide the pin for reciprocating movement relative to the bushing body; and a releasable interconnection between the insert and the bushing body to allow a disconnection of the insert and its replacement with a second replaceable insert of the same size as the first insert in the bushing body without removing the mold body from the mold unit;

wherein a force applying coupling is provided for detachable connection to one end of the guide pin to pull the guide pin, while the ejector assembly is in the mold.

12. In a mold body mounted in a mold press for molding plastic and having first and second portions movable toward and from each other, the combination comprising:

a guide pin on the first mold portion;

a bushing body recessed in the second mold portion and having a bore generally aligned with the guide pin;

a replaceable insert mounted in the bore on the bushing body and having an insert bore to receive the pin and to guide the pin for reciprocating movement relative to the bushing body; and a releasable interconnection between the insert and the bushing body to allow a disconnection of the insert and its replacement with a second replaceable insert of the same size as the first insert in the bushing body without removing the mold body from the mold unit;

the insert comprising a body of solid lubricant mounted on the insert to rub against the guide pin and to apply solid lubricant to the guide pin.

13. The mold body of claim 12 wherein the insert has an internal bore surface made of porous metal that will receive in its porous metal the solid lubricant from the guide pin.

14. The mold body of claim 13 wherein the porous metal is an aluminum bronze material.

15. The mold body of claim 14 wherein the solid lubricant is PTFE.

16. An injection molding assembly including a mold having a cavity, the mold being removably held in a press with shots of heated plastic molding material directed into the mold cavity to form parts with the mold, the injection molding assembly comprising:

a mold body having a pair of mold halves for molding a plastic part with one of the mold halves being movable by the press between open and closed positions relative to the other mold half, the mold halves each having a portion of a part-forming cavity and each having a parting line surface to define a parting line therebetween in the closed position;

leader pins on the other mold half extending beyond the parting line surface on the other mold half for aligning the mold halves as they are moved to the closed position;

bushing bodies mounted in the one mold half and aligned with the leader pins;

replaceable inserts mounted in the bushing bodies and extending to the parting line surface on the one mold half and sized to receive the leader pons of the other mold half as the mold halves are moved to their closed part-forming position;

an insert-receiving bore wall on each of the bushing bodies for engagement with an outer surface on the replaceable insert received therein;

the replaceable inserts being separable from the bushing bodies by disengagement of the insert outer surfaces from the bore walls and movement of the inserts across the parting line surface on the one hold half while the one mold half is in the molding press; and a releasable interconnection between the replaceable inserts and the bushing bodies to allow the removal of the replaceable inserts from the bushings while leaving the bushing bodies in the one mold half while the mold halves are in the press and in their open position.

17. The injection molding assembly of claim 16 wherein the pins and inserts are sized to provide a slight clearance therebetween and there is a passageway for the mold body for introducing shots of plastic molding material to the cavity and heating of the passageway generates unequal thermal expansion between the mold halves sufficient to produce an interference between the pins and inserts; and the replaceable inserts are of a material to limit wear of the pins as the mold halves are moved to their closed position.

18. The injection molding assembly of claim 17 wherein the clearance between the pins and inserts is approximately 0.0010 inches and the other mold half is run at approximately 175 degrees fahrenheit and the one mold half is run at approximately 100 degrees fahrenheit producing an interference of approximately 0.0035 inches between the pins and inserts.

19. The injection molding assembly of claim 16 wherein the pins and inserts are sized to provide a slight clearance therebetween, and the inserts are of a hardened steel material to provide tight alignment between the mold halves as they are moved to their closed position.

20. The injection molding assembly of claim 19 wherein the pins have a tapered portion at their base adjacent the other mold part line surface and the top of the inserts have a correspondingly configured taper so that the pin is guided into aligned position within the insert and bushing as the mold halves move to their closed position.

21. A replaceable bushing insert for insertion into one mold half for receiving a leader pin of another mold half, comprising:

a cylindrical body having an internal cylindrical bore having a first thread thereon to receive and guide the leader pin;

a cylindrical shank on the body;

an enlarged annular rim on the cylindrical body having a diameter larger than a diameter for the cylindrical shank;

an external thread on the shank for threading into the first thread on the bushing body; and shoulders formed on the enlarged annular rim of the insert body for connection to a tool to unthread the insert from the bushing body.

22. A replaceable insert in accordance with claim 21 wherein a solid lubricant is provided in the bore wall of the insert to lubricate a leader pin.

23. An insert in accordance with claim 22 wherein the solid lubricant is PTFE.

24. An insert in accordance with claim 23 wherein the insert is made with a porous metal and of aluminum bronze.

25. A replaceable insert in accordance with claim 22 wherein the solid lubricant projects from the bore wall of the insert to a diameter less than the leader pin diameter so as to forcibly preload the lubricant to rub on the leader pin.

26. A replaceable insert in accordance with claim 21 wherein the insert cylindrical body is formed of a porous metal to be received therein solid lubricant from the leader pin.

27. An insert in accordance with claim 26 wherein the porous metal is an aluminum bronze material.

* * * * *